UNITED STATES PATENT OFFICE.

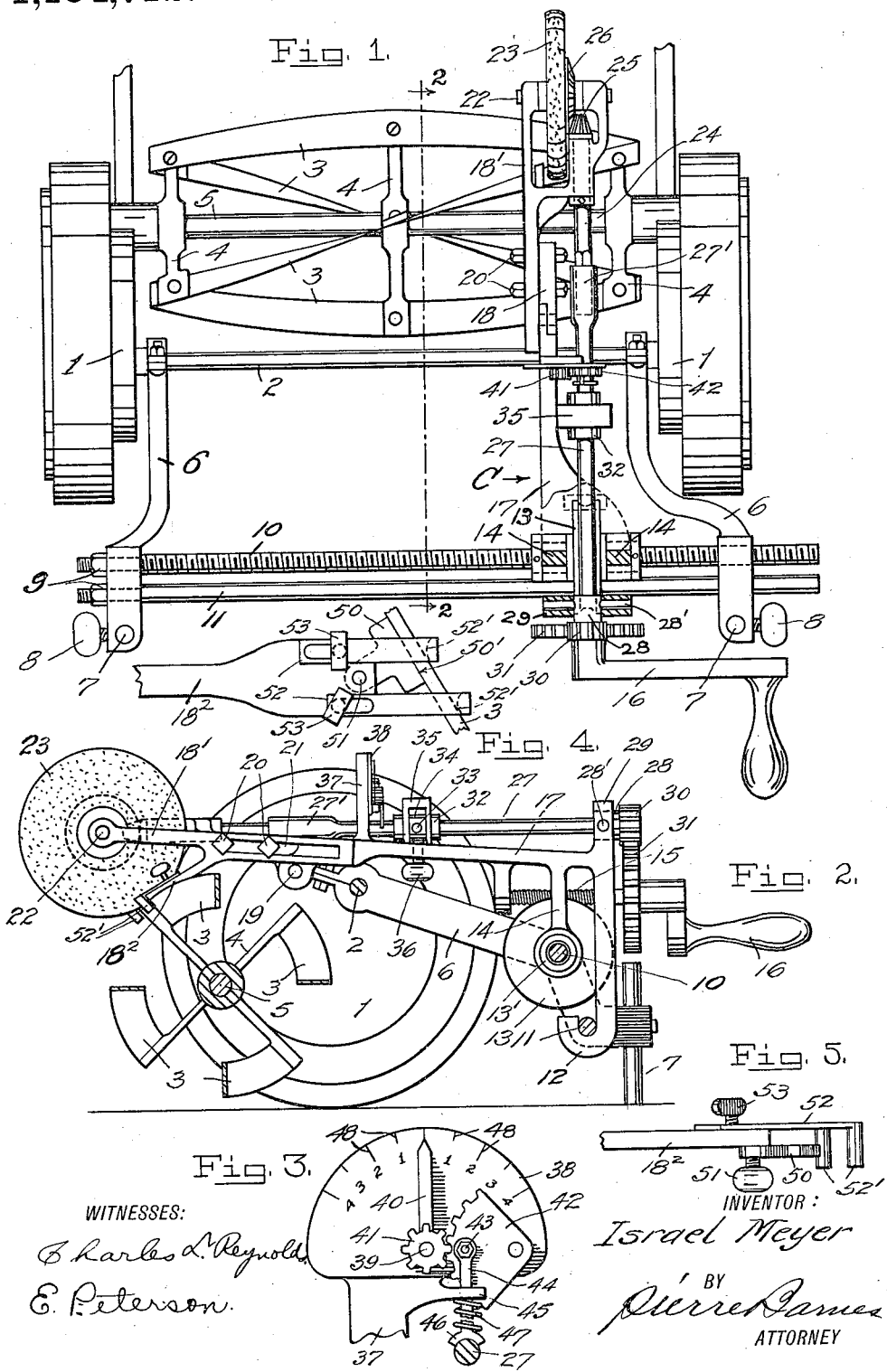

ISRAEL MEYER, OF SEATTLE, WASHINGTON.

LAWN-MOWER GRINDER.

1,154,712.

Specification of Letters Patent.   Patented Sept. 28, 1915.

Application filed October 19, 1914.   Serial No. 867,288.

*To all whom it may concern:*

Be it known that I, ISRAEL MEYER, a citizen of the United States, residing at Seattle, in the county of King and State of Washington, have invented certain new and useful Improvements in Lawn-Mower Grinders, of which the following is a specification.

This invention relates to lawn-mower sharpeners; and its object is to produce a machine of this character whereby the cutting blades may be accurately and uniformly ground.

The invention consists in the novel construction and combination of parts, as will be hereinafter described and claimed.

In the accompanying drawings, Figure 1 is a plan view, shown partly in section, of an embodiment of the invention applied to a lawn-mower, only such parts thereof being shown as are necessary for an understanding of the invention. Fig. 2 is a vertical sectional view through 2—2 of Fig. 1. Fig. 3 is a detail front elevation of the indicating devices employed in adjusting the grinding mechanism. Fig. 4 is a plan view of the blade guide and Fig. 5 is a side elevation thereof.

The reference numeral 1 designates the side members of a mower frame and 2 is a transversely arranged bar forming part of said frame connecting the side members 1.

3 represents the helical cutter-blades which are connected by the arms of spiders 4 to a shaft 5, as usual.

In carrying out my invention, there is provided bracket elements 6 which are detachably connected at their forward ends to the frame-bar 2 and have their rear ends supported by legs 7 which may be secured in adjusted positions by means of set-screws 8. Extending through said brackets and rigidly secured to one of them, as by nuts 9, are parallel rods 10 and 11, whereof the former, 10, serves as a track-rail for a carriage C which supports the operating mechanism of the grinding appliances, and the other coacts with a hooked arm 12 of the carriage to prevent the forward tilting of the same. The rod 10 is, moreover, screw-threaded for engagement with an internally threaded hub or nut 13¹ formed on or provided in a worm-wheel 13 which is rigidly secured to said bushing and journaled in arms 14 provided on the carriage. The arms 14, by being located at opposite sides of the wheel 13, prevent any independent axial movement of the wheel with respect to the carriage and, in consequence, the turning of the wheel; and through the office of the screw rod 10, the carriage is caused to be moved in one lateral direction or the other.

15 represents a screw or worm for operating said wheel and constitutes a shaft journaled in bearings on the carriage and provided with a crank-handle 16. The carriage is provided with a forwardly directed arm comprising two members 17 and 18 hingedly connected by a pivotal pin 19 to allow a vertical swinging movement, to the forward one. The latter, 18, in turn, is made of two parts which are connected by fastening bolts 20 extending through a slot 21 in the one to permit its being moved in or out as may be required, according to the size of a mower. In the outer part, 18¹, of such extensible member are provided bearing boxes for the transversely arranged arbor 22 of an emery wheel 23 and also a bearing for a longitudinally disposed shaft 24 whereby the emery wheel 23 is driven through the medium of bevel gears 25 and 26. The shaft 24 extends into the socket of a coupling 27¹ of a shaft 27 to allow relative endwise movements of the two shafts but no independent rotary movement, as for example, by forming the end of the shaft 24 polygonal to fit into a correspondingly shaped socket in the coupling. Adjacent to the rear end of shaft 27 is a bearing box 28 therefor which is swiveled as by trunnions such as 28¹, Fig. 2, to a standard 29 provided on the carriage.

30 is a gear wheel secured to shaft 27 and in mesh with a relatively large gear 31 secured to the worm-shaft 15 so as to transmit a high speed rotary motion from the crank-handle 16 to the shafts 27 and 24 to drive the emery wheel.

32 represents a journal box for shaft 27 and is provided with trunnions, as 33 (Fig. 2) which are pivoted in blocks, as 34, movable vertically in slots provided in a guide-block 35 integral with the carriage arm 17. The box 32 is adjustably held at selected heights by means of a screw 36 passing through a screw-threaded hole in the referred to carriage-arm.

In proximity to the outer extremity of the carriage arm 17 it is provided with a post 37 terminating in a dial plate 38. Connected to this plate by a pivotal pin 39 is an index finger 40 and a toothed gear wheel 41 which is in mesh with a sector-gear 42.

Depending from a pin 43 provided near the periphery of the sector-gear is a rod 44 passing through a guide 45 and having at its lower end a foot 46. A spring 47 interposed between the guide 45 and the foot 46 of the rod serves to yieldingly press the latter against the shaft 27 and must move up or down with the same.

The dial plate 38 is provided with graduated marks 48 which serve with the finger 40 to indicate the relative elevations of the shaft. The emery wheel 23 is adjusted by regulating the effective lengths of the carriage arm elements 18 and $18^1$ to a predetermined position with respect to the rods 10 and 11 and the axle 5 of the cutter-wheel to correspond to the bevels it is desired to grind the blades 3 and also to accommodate the grinding machine to various sizes of mowers. Accordingly the cutter-wheel is turned to present a blade being operated upon as the carriage progressively moves from one side of the mower to the other. To thus control the cutter wheel, I provide devices secured to a branch $18^2$ of arm-part $18^1$ and consisting of a guide plate 50 secured for rotary movements to said branch by a thumb-screw 51 so as to swing the plate into position to have the guide-face $50^1$ (Fig. 4) thereof contact with the inner face of a blade 3.

For contacting against the outer face of the blade I provide two slotted bars 52 having downwardly directed extremities $52^1$ to bear against the blade. Inasmuch as the longitudinal curvature of blades vary with different makes of mowers and by reason that some are right and others left-hand helices, the bars 52 are rendered adjustable with respect to the branch $18^2$ by means of thumb-screws 53 passing through the slots of the respective bars to engage in screw-threaded holes provided in such branch.

The machine is adjusted as to the position of the emery wheel with relation to a cutter blade—first, by regulating the arms 18 and $18^1$ of the carriage; and secondly, by moving the carriage from one end of its travel to the other and noting by the finger 40 and dial marks 48 the lowest elevation of the emery wheel, whereupon the screw 36 is adjusted to be encountered by the box 32 and prevent any lowering of the emery wheel below such elevation. The purpose of limiting the downward movement of the emery wheel is to cause a blade to be ground uniformly throughout its length. This is effected by the unbalanced weight of the carriage and attachments thereof bearing the emery wheel down upon the blade during the grinding of the same until arrested by the box 32 being stopped by the screw 36.

The operation of the invention is as follows: By turning the crank-handle 16 the shaft 15 is actuated to impart rotary motion to the wheel 13 and the latter, by the provision of the screw-threads in its hub, engaging threads of rod 10, effects the lateral travel of the carriage. The turning of the crank-handle also rotates the gear 31 whereby the shaft 27 is rotated through the medium of the gear 30. The shaft 24 which is coupled to the driven shaft 27 is rotated in unison therewith and, through the gears 25 and 26, causes the emery wheel 23 to grind the cutter blade which is controlled by the guiding devices 50 and $52^1$, as above explained.

What I claim as my invention, is—

1. In a lawn-mower grinding machine, the combination of a carriage, an emery wheel, a shaft therefor, a swivel journal-box supported by the carriage and affording a bearing for an end of the shaft, means to regulate the elevation of the free end of the shaft, and indicating devices influenced by said shaft for adjusting said regulating means.

2. In a lawn-mower grinding machine, a carriage having an extensible arm hingedly connected thereto, an emery wheel, shafts for driving said wheel, and journaled in boxes respectively provided on the carriage and said arm, means to propel the carriage, and a driving means for operating both the carriage-propelling means and the shaft.

Signed at Seattle, Washington, this 3rd day of October, 1914.

ISRAEL MEYER.

Witnesses:
PIERRE BARNES,
E. PETERSON.

Copies of this patent may be obtained for five cents each, by addressing the "Commissioner of Patents, Washington, D. C."